United States Patent [19]

Peterson

[11] Patent Number: 5,080,880
[45] Date of Patent: Jan. 14, 1992

[54] METHOD OF HYDROLYZING METAL HALIDES

[75] Inventor: John R. Peterson, Salem, Oreg.

[73] Assignee: Teledyne Industries, Inc., Albany, Oreg.

[21] Appl. No.: 365,433

[22] Filed: Jun. 13, 1989

[51] Int. Cl.$^5$ ............ C01B 7/03; C01G 33/00
[52] U.S. Cl. ................... 423/481; 423/492; 423/592
[58] Field of Search ........... 423/481, 492, 608, 592, 423/612, DIG. 9

[56] References Cited

U.S. PATENT DOCUMENTS

| | | | |
|---|---|---|---|
| 2,303,307 | 11/1942 | Tillman | 423/612 |
| 2,426,788 | 9/1947 | Pall | 423/612 |
| 3,133,788 | 5/1964 | Kern et al. | 423/592 |
| 3,852,430 | 12/1974 | Lienau et al. | 423/481 |
| 4,741,894 | 5/1988 | Melas | 423/608 |
| 4,948,570 | 8/1990 | Sommers | 423/65 |

Primary Examiner—John Niebling
Assistant Examiner—Brian M. Bolam
Attorney, Agent, or Firm—Shoemaker and Mattare

[57] ABSTRACT

A process relating to the hydrolysis of metal halides and their production of corresponding metal oxides by the hydrolysis of their chlorides and the calcining of the hydrolysis product is disclosed. Novel aspect including obviating the neutralizing step for the hydrochloric acid by using ammonia and disposing of the resulting ammonium chloride and the two step addition initially of metal halides to water until there is no observable positive heat of reaction and then adding the metal halide in amounts up to the stoichiometric quantity for the hydrolysis product obtained.

4 Claims, No Drawings

METHOD OF HYDROLYZING METAL HALIDES

BACKGROUND OF THE INVENTION

The present invention relates to the hydrolysis of metal halides and more particularly to the production of the corresponding metal oxides by the hydrolysis of the chloride and calcining the hydrolysis product.

Current practice for the production of $Nb_2O_5$ and $TaCl_5$ utilizes for example, $NbCl_5$ from a ferroniobium (FeNb) chlorinator as the feed for $Nb_2O_5$ production. The $NbCl_5$ is mixed with $H_2O$ forming a hydrolysed $NbOCl_3 \cdot xH_2O$ in a highly acidified (HCl) solution. This solution is pH adjusted with ammonia to further convert the $NbOCl_3 \cdot xH_2O$ to hydrolysed $Nb_2O_5$. The solution is then filtered and calcined at high temperature to produce dry $Nb_2O_5$. The addition of ammonia is expensive and produces a waste disposal problem. Further, the addition or loading of $NbCl_5$ to water is limited in the present practice to about 2 lbs of $NbCl_5$ per gallon of water. The filtration of the ammoniated $NbCl_5$ water mixture is required to eliminate excess water and decrease the mass of material going to the kiln which typically would then contain only 15% to 20% solids. Finally the prior use of ammonia produced ammonium chloride in the off gases from the kiln which required a large flue gas scrubbing capacity.

It is therefore an object of the present invention to eliminate the use of ammonia in the production of $Nb_2O_5$ by the hydrolysis of $NbCl_5$.

It is a further object of the present invention to increase the production of $Nb_2O_5$ while decreasing the volume of water required.

It is also an object of the present invention to provide a more energy efficient process for the production of $Nb_2O_5$.

SUMMARY OF THE INVENTION

It has been discovered that the hydrolysis of $NbCl_5$ if done at a loading greater than about 3 pounds per gallon of water produces a fluid mixture which can be directly charged into a calcining kiln to produce $Nb_2O_5$.

DETAILED DESCRIPTION OF THE INVENTION

Conventionally the hydrolysis of the chlorides of niobium, tantalum vanadium and titanium have all employed a neutralizing step, e.g. ammonia to produce a solid suitable after filtering for charging into a kiln. As previously described, the process steps thought to be necessary limited the loading of the chloride in the water and produced further process complications and inefficiencies.

The process steps shown in Table 1 compare the prior process to the process of the present invention when hydrolyzing $NbCl_5$.

TABLE 1

| Old Process | Process of This Invention | |
|---|---|---|
| 1.8# $NbCl_5$ | 15# to 20# $NbCl_5$ | |
| + | + | |
| 1 gal $H_2O$ | 1 gal $H_2O$ | |
| + | | |
| $NH_4OH$ | Kiln (750° C.) | |
| Filtration | 400 to 600#/hr | |
| waste liquor | | HCl to scrubber for |
| Kiln (1000° C.) | $Nb_2O_5$ | |
| 200 to 400# | | |

TABLE 1-continued

| Old Process | Process of This Invention |
|---|---|
| $Nb_2O_5$/hr | recovery and sale or use |
| waste $NH_4Cl$ to scrubber | |
| $Nb_2O_5$ | |

It will be clearly seen that the steps of adding ammonia and filtering have been eliminated. Likewise, since the niobium loading or concentration is so much higher in the process of the present invention, the evaporative loading of the kiln is lower and therefore the overall process efficiency increases since the kiln can process more oxide with less fuel, at lower temperatures.

It is surmised that the prior process was designed with the highly acidic nature of the chlorides in mind and the perceived need to protect downstream process equipment. These concerns then dictated the use of a large volume of water and the step of neutralizing the solution. Further, loading $NbCl_5$ into water at the level of one to two pounds per gallon produced a significant heat of reaction and heat of solution which raised concerns about the containment of the materials when the mixture became hot enough to boil out liquid HCl above its dew point and perhaps even $NbCl_5$.

Surprisingly, it has been discovered that continued additions of the chloride does not continue to heat the solution. Initial additions, i.e. up to two to three pounds per gallon will raise the temperature of the water to 70° C. to 90° C. At this point the temperature stopped rising as further additions were made and there were indications that the heats of reaction and/or solution had indeed ceased being positive and even turned from positive to negative, permitting substantial additions up to a point where one half of the stoichiometric amount of $NbCl_5$ to available water was reached. In addition to this phenomenon the solution which was becoming more viscous at the two to three pounds per gallon level began to become more fluid and would accept up to about 25 pounds of $NbCl_5$ per gallon of water before the viscosity again rose sufficiently to pose a problem for continued stirring and pumping. The liquid after mixing was capable of being fed directly into the kiln even though it was highly acidic i.e. a pH less than 1, with respect to HCl. Large volumes of HCl are given off in the mixing of $NbCl_5$ with water as well as in the direct firing in the kiln by a variety of reactions which would include, but not be limited to:

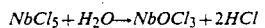

$$NbCl_5 + H_2O \rightarrow NbOCl_3 + 2HCl$$

$$2NbOCl_3 + 3H_2O + HEAT \rightarrow Nb_2O_5 + 6HCl$$

HCl gas with water is very corrosive at temperatures below the dew point or approximately 100° C. Care should then be taken in the selection of materials for the mixing tank and any scrubber over the tank using materials that are not attacked by warm HCl. Likewise the scrubber on the kiln has to be designed so that hot kiln off gas will reach the scrubber before cooling to the dew point, but will operate at a cool enough temperature so that the materials selected are not harmed by heat from the kiln. It was found that the HCl gas or acid is more easily scrubbed with water or HCl acid than the prior scrubbing required to remove the NH$_4$Cl of the ammonia neutralization process system.

The following experiments were designed and conducted to evaluate the prospect of increasing the NbCl$_5$ loading in the conventional process.

EXPERIMENT 1

The first experiment was to see how much NbCl$_5$ could be added to water, since an obvious disadvantage of the prior process was the large amounts of water involved.

The experimental design was simply to add 222 g NbCl$_5$ to 500 ml of water, or double the normal loading, in 10 g increments. At the same time, any temperature variations would be noted along with general observation of the changing nature of the mixture.

The procedure was as follows for two times the usual concentration of 1.85 pounds/gal:

A 2000 ml beaker with 500 ml of H$_2$O was packed in an ice bath with a stirrer to assist mixing and/or dissolution of the NbCl$_5$.

After adding about half the 222 g of NbCl$_5$, the mixture became so thick, like mud, that it stopped the stirrer motor and the temperature had risen to 57° C. Adding more NbCl$_5$ up to 222 g the temperature reached 69° C. but the mixture became thin and watery and stayed that way down to 10° C. After standing overnight without stirring, it looked like a thick lemon milk shake.

EXPERIMENT 2

A second experiment gave the following results:
Objective: To add three times normal, or 333 g, NbCl$_5$ to 500 mls water. As the experiment proceeded, it was decided to add more NbCl$_5$.

TABLE 2

| NbCl$_5$ Addition | Total NbCl$_5$ Added | Temperature of Mixture °C. | Observations |
|---|---|---|---|
| 0 | 0 | 10° C. | In ice bath |
| 135 g | 135 g | 60 | Thick like mud |
| +178 g | 313 g | 60 | Thin, watery |
| +43 g | 356 g | 75 | More watery |
| +97 g | 453 g | 26 | Still watery |
| +350 g | 803 g | | |
| +92 g | 895 g | 31 | NbCl$_5$ would sit on top for a while before mixing in. Ice completely melted. |
| +105 g | 1000 g | 26 | very liquid |
| Net weight of the mixture | 1250 g | | |
| volume | 625 cc | | |
| density | 2 g/cc | | |

The mixture was then poured into a quartz tray heated on a hot plate for preliminary drying. When there was no apparent moisture in the mix, it was then calcined at 1000° C. for 1½ hours in a muffle furnace.

EXPERIMENT # 3

This experiment was a repeat of Experiment 2 but without the ice bath and more rapid addition of the NbCl$_5$ up to 1.5 times as much, or 1550 g, for 500 ml of water.

TABLE 3

| NbCl$_5$ additions | Total NbCl$_5$ Added | Temperature of Mixture °C. | Observations |
|---|---|---|---|
| 0 | 0 | 23 | |
| 375 g | 375 g | 85 | No thickening like occurred in the ice bath experiments. |
| 375 g | 750 g | 45 | NbCl$_5$ floating on top and dissolving slowly. |
| 250 g | 1000 g | 37 | Long dissolving time, minutes. |
| 500 g | 1500 g | 18 | Mixture is thickening but still very fluid. As soon as stirring stops, a skin forms on the top. |

Considerable fuming is evident during mixing, which is largely HCl.
Net weight 1450 g
Volume 575 cc
Density 2.5 g/cc The mixture was then dried in a quartz tray on a hot plate and calcined at 1000° C. in a muffle furnace for 1½ hours In an experiment to check recoveries of Nb$_2$O$_5$ from NbCl$_5$, the mixing, drying and calcining were done in one vessel with a resulting recovery of 97.5%.

Further laboratory experiments show that the high loading of TaCl$_5$ into water exhibits much the same behavior as NbCl$_5$. At the first additions of TaCl$_5$, there is a rapid rise of both temperature and viscosity as the loading of TaCl$_5$ continued. The following are two experiments conducted in the laboratory.

| | | Experiment #1 | |
|---|---|---|---|
| Time Min. | TaCl$_5$ Added grams | Temperature Before-After °C. | |
| 0 | 5 | 20.5-32 | Bright yellow solution |
| 2 | 5 | —41 | |
| 4 | 5 | 38-48 | |
| 6 | 5 | 41-50 | |
| 8 | 5 | 46-45 | Solution became thick, and as it cooled, even thicker |
| | Stir Motor Failed and Was Changed | | |
| 23 | 5 | 26-31 | Consistency of cream cheese-- bright yellow |
| 27 | 5 | 25-38 | |
| — | 5 | 37 | |
| — | 5 | 33-39 | |
| 34 | 5 | 35-37 | Darker yellow color like mustard--same consistency |
| 36 | 5 | 34-37 | |
| 38 | 5 | 35-36 | Looking watery |
| 40 | 5 | 35-35 | Thinner and more watery |
| 42 | 5 | 35-33 | Thinner still |
| 44 | 5 | 33-32 | Dark yellow, consistency of mustard |
| 47 | 5 | 26-27 | |
| 49 | 5 | 26-27 | Turned greenish |
| — | 10 | 26-28 | Starting to thicken again |
| 54 | 10 | 21-26 | Skin forming on top of solution |
| 56 | 10 | 24-24 | |
| — | 10 | 21-21 | |
| — | 10 | 19.5-17 | Getting very thick, turning green gray |
| — | 10 | 17-15 | Stalled stir motor, looks like glue |
| 64 | 10 | 15.5-16 | Semi solid lump |
| | 10 | 16-13.5 | Thick blob |
| 69 | 10 | 15-15 | TaCl$_5$ did not mix in at this point |
| Total | 175 | | |

About 3.3 g of TaCl$_5$ per ml of water was the maximum loading reached. In terms of having a pumpable slurry, mix or solution, the optimum loading appears to be 1.5 to 1.9 g of $TaCl_5$ per ml of water. This is a lower loading than was obtained with $NbCl_5$ in water, but still exhibits a similar and useful cooling effect with a more watery consistency. Recovery is approximately 94%.

EXPERIMENT #2

In this experiment, the additions of $TaCl_5$ were larger and more rapid to a total of 150 g in 50 mls of water.

| Time Min. | $TaCl_5$ Added grams | Temperature Before-After °C. | |
|---|---|---|---|
| 0 | 25 | 21-71 | Thick yellow paste |
| — | 25 | 57-65 | |
| 6 | 25 | 55-53 | Looks Watery--greenish in color |
| 8 | 25 | 46-42 | Stir motor stalled, chunky yellow-green |
| 13 | 25 | 42-34 | Dry looking mud, stirred by hand |
| — | 25 | 32-24 | Almost solid |
| Total | 150 | | |

The rapid heating and thickening are at first evident at 0.5 g per ml of water, then at 1.5 g $TaCl_5$/ml water it is obviously watery and cooling. The temperature drops rapidly at 2.0 g $TaCl_5$ ml water and the mix thickens.

It is apparent from the foregoing that the same advantages exist in producing $Ta_2O_5$ from $TaCl_5$ as described for $NbCl_5$ to $Nb_2O_5$ conversion even though the loading figures are somewhat lower.

The foregoing descriptions of the present invention demonstrates several important differences and advantages over the prior conventional practice. First, only water and a kiln are required to form $Nb_2O_5$ from $NbCl_5$. This elimination of the neutralization step produces several important advantages, including cost savings in material, labor and equipment in both the running of the process and the handling of by-product waste from the process.

Finally, the calcined oxide produced by the practice of the present invention exhibits a higher bulk density without further processing than the product of the prior process. This property makes the product more suitable for subsequent processing into the pure metal or use in niobium containing ceramics.

The invention has been described in terms of its preferred embodiments, however, it will be appreciated that the process is applicable to the hydrolysis of any metal chloride with or without subsequent conversion to the oxide. It is therefore contemplated that the invention is not limited to the embodiments described and should only be limited in scope to the scope of the appended claims interpreted in view of the pertinent prior art.

I claim:

1. A process for hydrolysis of niobium pentachloride comprising the steps of:

1) adding niobium pentachloride to water at a rate of addition sufficient to raise the temperature of the aqueous solution above ambient temperature but below the boiling point of Hcl; and
   2) continuing the addition of the niobium pentachloride to the solution until the temperature of the solution declines due to an endothermic reaction or negative heat of solution; and
   3) continuing the addition until between about three to about twenty-five pounds of niobium pentachloride per gallon of water has been added.

2. A hydrolysis product of niobium pentachloride and water prepared by the process of:

1) adding niobium pentachloride to water at a rate of addition sufficient to raise the temperature of the aqueous solution above ambient temperature but below the boiling point of HCl; and
   2) continuing the addition of the niobium pentachloride to the solution until the temperature of the solution declines due to an endothermic reaction or negative heat of solution; and
   3) continuing the addition until between about three to about twenty-five pounds of niobium pentachloride per gallon of water has been added; and
   4) separating the precipated hydrolysis product from the solution, where by said separated product is capable of being directly heated in air at elevated temperatures to produce niobium oxide.

3. A process for producing niobium pentoxide from niobium pentachloride comprising the steps of:

a) charging at ambient temperature between about 3 pounds to about 25 pounds per gallon of water niobium pentachloride into water at a rate sufficient to raise the temperature of the solution formed and to reach the point where the heat of reaction or solution of the niobium pentachloride with the aqueous solution is no longer positive and the temperature of the solution declines;
   b) separating the hydrolysis product from the solution; and
   c) directly, in a one-step procedure calcining the product of step b) at a sufficiently high temperature for sufficient period of time to produce the niobium oxide.

4. A process for producing hydrochloric acid from niobium pentachloride comprising the steps of:

a) charging at ambient temperature between about 3 pounds to about 25 pounds per gallon of water niobium pentachloride into water at a rate sufficient to raise the temperature of the solution formed and to reach the point where the heat of reaction or solution of the niobium pentachloride with the aqueous solution is no longer positive and the temperature of the solution declines;
   b) separating the hydrolysis product from the solution; and
   c) recovering hydrochloric acid from the solution after separation of the product from the solution.

* * * * *